Jan. 5, 1965   P. L. GRAFSTEIN ETAL   3,164,435
FACSIMILE RECORDERS
Filed May 11, 1962   2 Sheets-Sheet 1
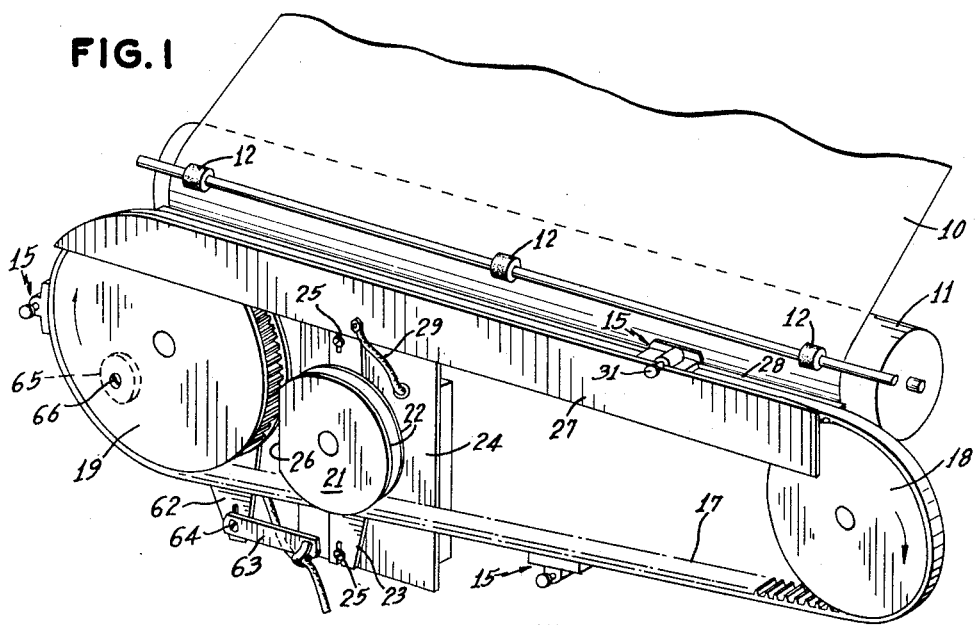
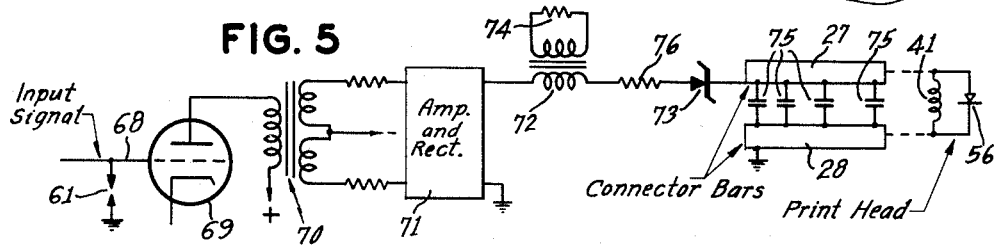
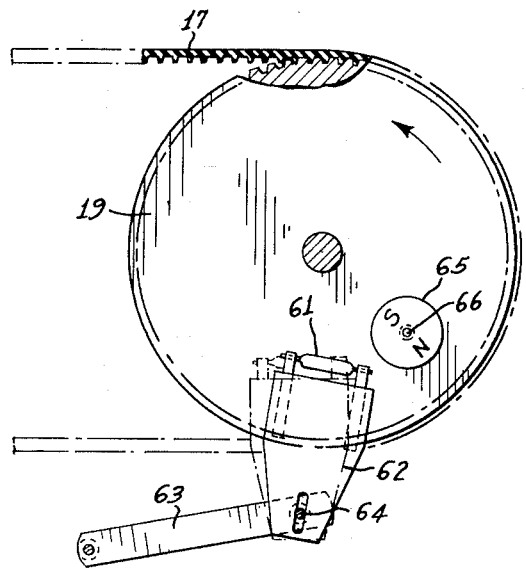
INVENTORS
PAUL L. GRAFSTEIN
WALTER J. HARSHBARGER
BY
ATTORNEY Jan. 5, 1965 P. L. GRAFSTEIN ETAL 3,164,435
FACSIMILE RECORDERS
Filed May 11, 1962 2 Sheets-Sheet 2

INVENTORS
PAUL L. GRAFSTEIN
WALTER J. HARSHBARGER
BY
ATTORNEY

United States Patent Office 3,164,435
Patented Jan. 5, 1965

3,164,435
FACSIMILE RECORDERS
Paul Louis Grafstein, Brooklyn, N.Y., and Walter J. Harshbarger, Somerville, N.J., assignors to Litton Systems, Inc., Beverly Hills, Calif.
Filed May 11, 1962, Ser. No. 193,951
9 Claims. (Cl. 346—139)

This invention relates to facsimile recorders, more particularly of the type employing a magnetic or impact printing head which is electrically energized from a suitable signal input source.

Facsimile recorders in general use are either of the photographic or the electric-current stylus type employing an electro-sensitive paper for recording. Another type of recorder employs magnetically driven pressure elements for impact recording on a pressure-sensitive material or with carbon paper. A recorder of this type employing a helix-and-bar recording system is disclosed in the prior application of A. G. Cooley, Ser. No. 839,959, filed September 14, 1959, and assigned to the assignee of the present application. Recorders of this type have the advantage that ordinary paper may be used for recording with a carbon transfer paper sheet, or an inexpensive coated pressure-sensitive paper; and two or more copies may be made simultaneously.

It is a primary object of the present invention to provide a magnetic recorder for facsimile or other reproduction, which employs a plurality of movable printing heads for subjecting the pressure-sensitive marking sheet or web to controlled pressure at selected points thereof.

It has been found that recorders which employ a current-conducting stylus for marking on electro-sensitive paper have the drawback that radiation is produced which, for example, affects nearby radio receivers, causing interference or noise which is objectionable. Shielding the equipment makes operation and repair more difficult, and is only partially effective. This drawback may be avoided by the use of the pressure-recording principle provided any arcing or other cause of high-frequency radiation in the recorder unit during the recording process is eliminated.

Thus it is another object of the present invention to reduce to a minimum the radiation of high-frequency energy from a facsimile recorder and thereby eliminate interference during the recording process with radio receivers or other nearby equipment.

Another object of the invention is to provide an improved facsimile recorder of the type employing an endless carrier or belt for driving or propelling the print head across the width of the recording sheet.

A still further object of the invention is to improve and simplify the construction of a facsimile recorder of the type employing a movable electromagnetic print head for applying controlled pressure to the recording sheet or web.

In accordance with the invention, the input signal to a recorder is impressed upon a movable print head having an electromagnet for actuating a marking element against the recording sheet to record the signal as a mark. The print head is guided across the width of the recording sheet along a predetermined path by a pair of parallel guide bars which also serve to conduct signal current from the input signal amplifier to the print head. A switch is provided to short-circuit or disable the signal amplifier as the contact brushes on the print head engage and disengage the connector guide bars, so that radiation due to arcing at the brushes is eliminated.

In the preferred embodiment, the switch is of the magnetic-reed type and is periodically operated by a magnet mounted on a wheel or other movable element which moves in synchronism with the travel of the print head.

A plurality of print heads may be employed and driven successively across the width of the recording sheet, a single switch being arranged to disable the system as each print head starts and ends its recording function. Further provisions are made to insure that there will be no radiation from the amplifier circuit or the connector bars, as explained below. The print head may comprise a conducting stylus which is de-energized by said switch at the beginning and end of the recording trace.

Other objects and advantages of the present invention will become apparent from a study of the following detailed description and the appended drawings illustrating one embodiment thereof, and in which FIG. 1 is a front elevational view of a facsimile recorder employing a plurality of electromagnetic print heads;

FIG. 2 is a detailed view showing the mounting of a control switch;

FIG. 5 is a schematic diagram of the signal circuit for the recorder shown in FIGS. 1–4.

Figure 3:
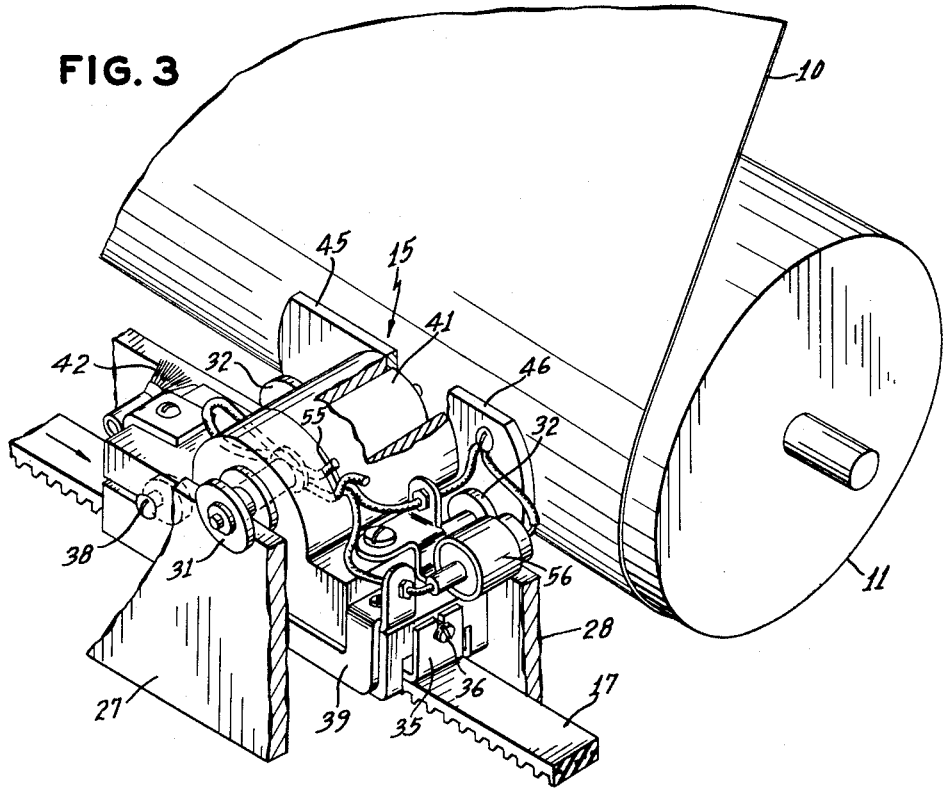
FIG. 3 is a perspective view showing part of the recording mechanism, including one of the print heads, to an enlarged scale.

Referring to the drawings, FIG. 1 shows by way of example a facsimile recorder of the continuous or web type employing a web 10 of pressure-sensitive paper of the well known type which is marked by the application of pressure to the surface of the paper. While only a single web is shown, two or more webs may be superimposed to effect a plurality of simultaneous records. Instead of using a pressure-sensitive paper, obviously a sheet of carbon transfer paper may be superimposed upon a base sheet of ordinary white paper, the pressure of the marking element causing transfer of carbon to the base sheet and marking the same in accordance with the operation of the print head. Ordinarily it is preferred to use a pressure-responsive paper or blank of the type which by virtue of its composition, coating, impregnation or other treatment during manufacture undergoes a localized visible change or mark at the particular area or areas to which impact or pressure is applied by a pressure marking stylus. Such papers are well known in the art and may, for example, comprise a colored paper with a porous surface coating, such as a blushed lacquer film or any foam-like or cellular coating structure which produces a mark upon compression. Many known papers of this general type have suitable marking properties and may be used in a recorder embodying the present invention.

The recording sheet or web 10 is fed past the recording system at a uniform rate as the recording progresses. As shown by way of example, the paper feed is effected by a driven feed roll 11, the sheet or web being held in frictional contact with the feed roller 11 by soft rubber pressure rollers 12.

Figure 4:
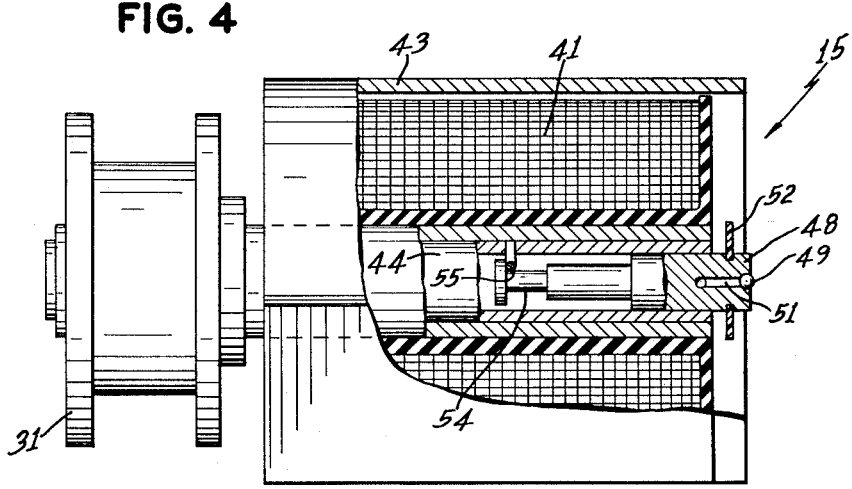
FIG. 4 is a detailed view partially in section, showing a preferred construction of print head electromagnet and armature.

The recording system, in accordance with the invention, may comprise a plurality of print heads 15, three in number in the recording unit shown in the drawing. Each print head 15 comprises an electromagnet having a movable armature which is provided at the outer end adjacent the surface of the recording sheet with a pressure-marking element. The detailed construction of a preferred form of print head is illustrated in FIGS. 3 and 4.

As shown in FIG. 1, the three print heads 15 are equally spaced apart and attached to an endless driven belt or carrier 17 so as to be traversed in succession across the width of the recording sheet or web 10. Thus by applying signal current to the particular print head which is traversing the surface of the recording sheet 10, successive recording lines are traced on the sheet as the same is fed forward in the recording process, and a facsimile recording is produced by marking successive elemental areas as well known in the art. The belt or carrier 17, as shown by way of example consists of a toothed flexible timing belt, the teeth of which engage the gear teeth on two supporting wheels 18 and 19, spaced apart to provide a linear span of the belt adjacent to the surface of the recording sheet or web 10. One of the wheels 18 or 19 is driven by a suitable motor (not shown) in synchronism with the operation of the transmitting mechanism at the remote transmitter. The belt 17 may be constructed of elastic metal or alloy, or of rubber reinforced with strands of wire. While a toothed rubber belt of this type is shown, various other means for supporting and propelling the print heads may be substituted for the belt, depending upon the size and speed of the recording system and the type of recording desired, such as a metal band, a pivoted arm, etc.

The rotation of the wheel 19 is synchronized with the movement of the print heads 15. Thus, for example, the circumference of the wheel 19 may be exactly equal to the spacing of the print heads 15, so that the wheel 19 makes exactly one revolution while each print head is traversing the width of the sheet or web 10. A freely rotatable wheel 21 may be provided for adjusting the tension in the belt 17. The wheel 21 may be provided with flanges 22 as shown for guiding the belt or carrier 17. An adjustable supporting plate 23 on which the wheel 22 is journaled is carried by a supporting member 24, forming a part of the frame of the recorder. The plate 23 may be vertically adjusted on the supporting member 24 and locked in position by the screws 25, to adjust the tension in the belt or carrier 17 as desired. One side of the wheel 21 is cut away, as indicated at 26, to provide clearance for the print heads 15, the wheel 21 being geared to the belt 17 as in the case of the wheels 18 and 19 and dimensioned to make two revolutions for each cyclic operation of the print heads. Other suitable tensioning and guiding means for the belt or carrier 17 may be substituted, or such means may be omitted if not required.

In order to connect the print heads 15 to a source of signal current, two parallel current-conducting bars or plates 27 and 28 (see FIGS. 1 and 3) are mounted on the recorder frame parallel to the upper linear span of the belt or carrier 17. The connector bars or plates 27 and 28 are connected in any suitable manner to the source of signal current, the connection of the bar 27 being indicated at 29 in FIG. 1. The bars or plates 27 and 28, besides serving as connector bars for conducting current to the print heads, also serve as guide members for guiding the print heads in a precise rectilinear path across the width of the web or sheet 10. For this purpose each print head is provided with a front roller 31 and a pair of pivoted back rollers 32 engaging the upper guide surfaces of the bars or plates 27 and 28 respectively, as more clearly shown in FIG. 3. In this manner each print head may be propelled at the desired synchronous speed by the belt or carrier 17 while being guided accurately in the desired track in relation to the surface of the recording sheet or web 10 by the combined trolley and guide bars 27 and 28. A bracket 35 attached to the belt or carrier 17 serves to lock the print head 15 to the belt. An adjusting screw 36 threaded into the print head and engaging the supporting bracket 35 permits longitudinal adjustment of the print head in relation to the belt or carrier 17. The transverse or vertical adjustment of the marking point of the print head 15 in relation to the recording sheet may be effected by turning an adjusting screw 38 attached for example to an eccentric journal, on which one of the wheels 32 is mounted.

The print head 15 is also provided with two contact brushes, one of which is indicated at 39, engaging the front and back guide bars 27 and 28, respectively. The contact brushes are connected to the terminals of the winding 41 of the electromagnet which controls the marking pressure applied to the surface of the sheet or web 10 as will be described. One or more cleaning brushes 42 are also mounted on the print head and engage the bearing surfaces of the bars 27 and 28 to maintain said surfaces clean.

The print head magnet which effects recording on the recording web or sheet 10 includes, besides the winding 41, a hollow shell 43 of iron or steel, a hollow axial central sleeve 44 and two projecting ears 45 and 46, extending close to the surface of the recording paper or web. The central axial sleeve 44 is adapted to receive a slidable armature 48, said armature closely fitting the cylindrical sleeve 44 and carrying at its outer tip end a marking element for engaging the surface of the sheet or web 10, such as a small carbide ball 49. The ball 49 is swaged into a recess in the end of the armature 48 and is rotatable therein. The magnetic circuit of the electromagnet includes the outer shell 43, the sleeve 44, the projecting ears 45 and 46, the armature 48, and the body of the feed roller 11, all of which are made of magnetizable metal or alloy. Thus when current is impressed upon the coil or winding 41, the armature 48 is attracted against the feed roller 11 and effects marking pressure on the sheet or web 10 corresponding to the level of the applied signal current.

In order to collect dirt or dust particles adhering to the ball 49, preventing such particles from causing the ball to stick or bind in its closley fitting recess, a hole 51 is drilled in the armature member 48 behind the ball 49. A dust shield 52 of plastic or other nonmagnetic material may be provided adjacent the tip of the armature member 48 to prevent the accumulation of dirt between the sleeve 44 and the movable armature. The rear end of the armature or marking element is also provided with a reduced portion 54, and a loop of spring wire 55 extending through the magnet shell 43 engages the armature to form a stop, and thereby limit the movement of the armature or marking element. When it is desired to replace the armature member 48, the projecting ends of the loop spring 55 are grasped by the fingers to lift the stop portion of the spring out of the recess 54 so that the marking armature member can be withdrawn from the sleeve 44.

While a preferred construction of print head has been illustrated in detail, it will be apparent that various modifications, such as changes in the size and shape of the component parts may be made, or parts omitted, without departing from the scope of the invention.

In accordance with a principal feature of the invention, a switch or circuit-closing device is provided to prevent emission of radiant energy from the recorder that would result from drawing an arc when the contact brushes 39 disengage the stationary current-conducting or connector bars 27 and 28. It has been found that radiation of this character also may occur when either brush initially makes contact with the cooperating connector bar, probably due to contact "bounce." In any case, it is found that interfering noise is generated in adjacent radio receivers in the case of arcing or sparking in the facsimile recorder. This is avoided by disconnecting or short-circuiting the input signal or interrupting the flow of current to the print head just before the contact brushes 39 engage and before they disengage the connector bars 27 and 28.

As shown by way of example, a magnetic type switch, such as a magnetic reed switch 61 (see FIG. 2) is provided which is cyclically operated in synchronism with the movement of the print heads 15 during the recording operation. The magnetic switch 61 is of the well-known type having normally open contacts which are closed when the switch is subjected to a magnetic field. A common form of magnetic reed switch that may be employed has reed contacts sealed in a dust-tight container or glass envelope. As shown in FIG. 2, the magnetic switch 61 is mounted on an adjustable supporting member 62 closely spaced from the synchronously rotating wheel 19. The supporting member 62 may be attached to a bracket 63 by a screw or other clamp 64, permitting the supporting member 62 and the switch thereon to be adjusted in both vertical and horizontal directions. A disc-shaped permanent magnet 65 is attached to the wheel 19 in a position where, during each revolution of the wheel, the magnet will be moved near the switch 61 and effect closure of the contacts of said switch for a predetermined time interval. The adjustable mounting of the switch 61 provides a ready means of changing the duration of closure of the switch contacts and the time of operation relative to the position of the print head 15. While a preferred construction of magnetic switch structure is illustrated, it will be obvious that various other switches and switch-operating means therefor may be employed, if desired.

In the amplifier circuit (FIG. 5), it will be noted that the normally open contacts of the switch 61 are connected across the signal input circuit 68. For example, the input circuit 68 may be connected to the grid of an amplifier 69 which is thus disabled by the closure of the contacts of the switch 61 as the print heads 15 approach and leave the recording area. Normally the amplified signal output from the amplifier 69 is connected through a transformer 70 to a conventional push-pull amplifier and full-wave rectifier 71. The rectified output signal current is connected through a low-pass filter 72 and a Zener diode 73 to one of the connector bars 27 or 28, the other of which is grounded. The low-pass filter 72 is of the inductive type and includes a secondary shunted by a low-resistance resistor 74 functioning to absorb the carrier frequency. A plurality of capacitors 75, for example four, are connected across predetermined points along the length of the connector bars 27 and 28, the capacitors preferably being spaced nonuniformly as indicated. The capacitors 75 may have a capacitance of the order of 0.001 mf. to 0.0001 mf., and serve to detune the antenna-like array presented by the parallel connector bars 27 and 28, and thus cut down radiation therefrom. The function of the Zener diode 73 and its associated limiting resistor 76 is to prevent the minute current produced by secondary emission in the amplifier tubes in the amplifier 71 from flowing in the coil 41 of the magnetic head 15 during the intervals that the switch 61 interrupts the signal at the print amplifier. Obviously, the described provisions for reducing radiation may be used with other types of electric recorders, including recorders of the electric-current stylus type; and in that case, it would ordinarily be only necessary also to shield the operating stylus against high-frequency radiation.

It will be evident that the recorder embodying the invention possesses outstanding features and advantages. It provides one or a plurality of copies, as desired, employing inexpensive recording media. In a facsimile recorder, the recorded copy is of high quality and the recording system requires no readjustment for protracted periods of use to maintain the fidelity of the recording. Furthermore, radio interference during recording is eliminated in a simple and effective manner.

While a specific embodiment of the invention has been illustrated and described herein for the purpose of clearly disclosing the underlying principles thereof, it will be apparent that the construction may be modified to meet the requirements of different applications and conditions of recording in general. Thus, by way of example and not of limitation, the radiation-control features could be used with other types of impact recorders, as well as recorders of the current-conducting stylus type. Also, the combined connector and guide bar construction could be modified in form and arrangement, and used in other types of web recorders and other known electrical devices of the prior art. Accordingly, the present invention is only to be limited by the spirit and scope of the appended claims.

What is claimed is:

1. In a facsimile recorder of the kind employing a sheet or web of pressure-sensitive marking material, in combination,
   a plurality of print heads for subjecting said sheet or web to controlled pressure at selected points thereof,
   an endless belt or carrier for traversing said print heads across said sheet or web,
   means including a stationary contact bar and a cooperating contact on each of said print heads for conducting current to the print head traversing the width of said sheet or web, each of said contacts being positioned to engage the surface of said contact bar while its print head moves across said sheet or web,
   an input signal circuit connected to said contact bar,
   circuit-closing means for short-circuiting said signal circuit as the contact on each print head engages and disengages the respective ends of said stationary contact bar,
   a magnet for operating said circuit-closing means, and
   means synchronized with the movement of said belt or carrier for moving said magnet toward and away from said circuit-closing means.

2. In a facsimile recorder of the kind employing a sheet or web of pressure-sensitive marking material, in combination,
   a plurality of print heads for subjecting said sheet or web to controlled pressure at selected points thereof,
   an endless belt or carrier for traversing said print heads across said sheet or web,
   means including a stationary contact bar and a cooperating contact on each of said print heads for conducting current to the print head traversing the width of said sheet or web, each of said contacts being positioned to engage said contact bar while its print head moves across said sheet or web,
   means for impressing signal currents on said print heads through said contact bar, and
   means for removing signal current from the contact bar as the contact on each print head engages and disengages the respective ends of said contact bar,
   said last-mentioned means including a magnetic switch, a magnet, and means for moving said magnet toward and away from said switch in synchronism with the movement of said print heads across the sheet or web.

3. In a facsimile recorder of the kind employing a sheet or web of pressure-sensitive marking material, in combination,
   a print head for subjecting said sheet or web to controlled pressure at selected points thereof,
   means for traversing said print head across said sheet or web,
   means including a stationary contact bar and a cooperating contact on said print head intermittently engaging said contact bar for electrically connecting said bar to the print head as it traverses said sheet or web,
   means for supplying signal current to said contact bar, and
   means for discontinuing the supply of current through said contact bar as the contact on the print head engages and disengages the respective ends of said stationary contact bar,
   said last-mentioned means including a magnet, means for moving said magnet in synchronism with the movement of said print head, and circuit-closing means operated by said magnet in a predetermined position.

4. In a facsimile recorder of the kind employing a sheet or web of pressure-sensitive marking material, in combination,
   a plurality of print heads for subjecting said sheet or web to controlled pressure at selected points thereof,
   an endless belt or carrier for traversing said print heads across said sheet or web, means including a rotatable wheel for supporting said belt or carrier, means including a stationary contact bar and a cooperating contact on each of said print heads for conducting signal current to the print head traversing the width of said sheet or web, an input signal circuit connected to said contact bar, and means including a magnet supported on said wheel for controlling the flow of signal current to said contact bar and thence to said print heads.

5. In a facsimile recorder of the kind employing a sheet or web of pressure-sensitive marking material, in combination, a plurality of print heads, each including an electromagnet for subjecting said sheet or web to controlled pressure at selected points thereof, means for moving said print heads successively across the surface of said sheet or web, an input signal circuit, means for connecting said input signal circuit intermittently through each of said print heads in desired sequence, said means including a movable magnet, means for moving said magnet along a predetermined path in synchronism with the movement of said print heads, and means including a magnetic switch in said input signal circuit disposed adjacent to the path of movement of said magnet for controlling said circuit when the magnet reaches a predetermined position.

6. In a facsimile recorder having a recording sheet or web, in combination, a print head comprising an electromagnet for effecting controlled recording on said sheet or web, a stationary contact bar, a contact on said print head engaging said contact bar and connected to said electromagnet, means for moving said print head to move the contact into engagement and out of engagement with said contact bar, a source of signal current connected to said contact bar, a Zener diode connected between said source and said contact bar to suppress signal current below a predetermined level, and circuit-closing means for eliminating radiation from the contact bar when said contact engages and disengages the bar during the movement of the print head.

7. In a facsimile recorder having a recording sheet or web, in combination, a movable print head for recording on said sheet or web, said print head comprising an electromagnet and a marking element actuated thereby, a pair of contact brushes on said print head connected respectively to the terminals of said electromagnet, means for traversing said print head across said sheet or web, means for supplying signal current to said electromagnet as it is traversed across said sheet or web, said last-mentioned means comprising two stationary current-conducting bars for contact respectively by said contact brushes, circuit-closing means for eliminating radiation from said bars when the contact brushes engage and disengage the bars during the movement of the print heads, and a plurality of capacitors connected across said stationary bars at points spaced along the length thereof.

8. In a facsimile recorder having a recording sheet or web, in combination, a plurality of print heads for recording on said sheet or web, each of said print heads comprising an electromagnet and a marking element actuated thereby, means for traversing said print heads in succession across said sheet or web, an input circuit, means including a pair of stationary current-conducting bars for connecting said input signal circuit to said print heads as each moves across the width of said sheet or web, and means including a plurality of capacitors connected across said bars for reducing radiation therefrom.

9. In a recorder of the kind employing a recording sheet or web, in combination, means for advancing said sheet or web, a marking element, means including a magnetic type circuit-closer for controlling the energization of said marking element, a movable magnet for intermittently operating said circuit-closer, and common means for moving said magnet and for propelling said marking element cyclically across the width of said recording sheet or web at a uniform rate.

References Cited in the file of this patent
UNITED STATES PATENTS

| | | |
|---|---|---|
| 2,141,974 | Finch | Dec. 27, 1938 |
| 2,597,199 | Stamper et al. | May 20, 1952 |
| 2,665,965 | Blackman | Jan. 12, 1954 |
| 2,814,547 | Cooley | Nov. 26, 1957 |
| 2,978,288 | Zabriskie et al. | Apr. 4, 1961 |